M. S. BASSETT.
Flour Sifter.
No. 11,115.  Patented June 20, 1854.
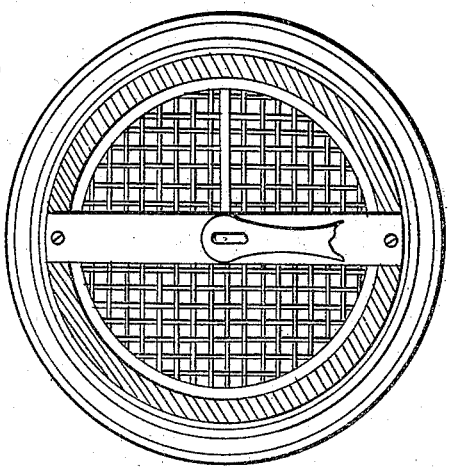
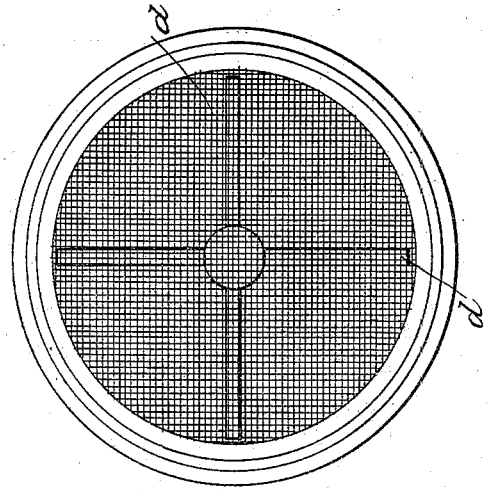
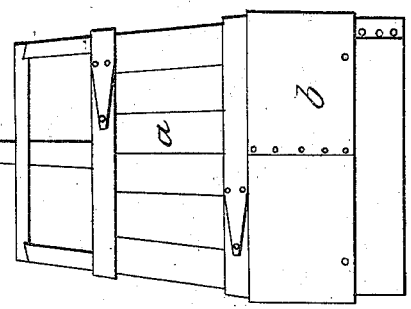
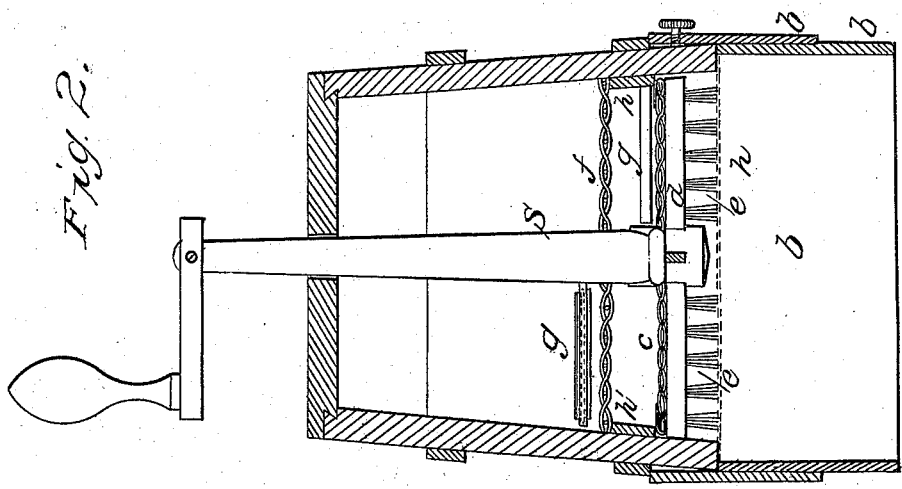

UNITED STATES PATENT OFFICE.

M. S. BASSETT, OF WILMINGTON, DELAWARE.

FLOUR SIFTER AND RENOVATOR.

Specification of Letters Patent No. 11,115, dated June 20, 1854.

*To all whom it may concern:*

Be it known that I, MARK S. BASSETT, of Wilmington, in the county of Newcastle and State of Delaware, have invented an Improvement in Flour-Sifters, and that the following is a full, clear, and exact description of the principle or character which distinguishes it from all other things before known and of the usual manner of making, modifying, and using the same, reference being had to the annexed drawings, of which—

Figure 1 is an elevation. Fig. 2 a vertical middle section. Fig. 3 a top view. Fig. 4 a bottom view.

My improved sifter or renovator as it is termed is intended mainly for use in families, stores, bakeries and such like, where flour, from long standing or previous age or from insects and other impurities requires to be resifted. The common practice in such cases is to use the hand sieve.

It is well known to storekeepers, that flour may be divested of mustiness to a great extent by re-handling it, and they frequently resort to the tedious practice of sifting a whole barrel of flour in a hand sieve. To facilitate this labor I have contrived my renovator. After flour has been packed the flour becomes "lumpy" as it is called and the first operation is to break down the lumps, the second to pass it through a coarse sieve to separate the larger impurities and lastly to pass it through a fine sieve. By these operations, the flour is thoroughly cleaned and stirred, and if musty, to a great extent sweetened by exposure to the air. I take a common firkin body $a$ Fig. 1, without the bottom and elevate it upon an open hoop-base, as shown at $b$ Figs. 1 and 2. This is an economical structure though others may be used for the frame work of the sieve. Through the top or cover of the firkin I pass a shaft $s$ to the lower end of which is fixed a sieve $c$, and also 4 radial arms $d$, at right angles to each other, to which arms are attached a series of brushes $e$, $e$. Above the middle sieve $c$ is the upper coarse sieve $f$, attached permanently to the inside of the firkin, and perforated to admit the shaft $s$ through its center. Fixed in the upper part of the hoop base is the lower fine sieve $h$.

The sieve $f$ may be attached in various ways, but as shown in the drawings it is fastened to an inside hoop $h'$ which hoop is secured to the sieve frame or firkin. Attached to the shaft above the sieve $f$, is an arm $g$, which is usually called the hopper boy or stirrer. Its use is to break the lumps of flour and must therefore be at sufficient distance above the sieve $f$ to override and break down the lumps, and to do this effectually I make this arm to revolve upon its axis, or make it the axis of a loose roller $g^2$. I prefer to call this arm a distributer. Over the middle revolving sieve $c$ is another distributer $g^1$ which is stationary and fixed to the inside hoop $h^1$ or elsewhere so as to be near enough to the sieve $c$. Sieve $c$ is supported mainly on the cross bars $d$, $d$. The operation of the renovator is simple. The distributer $g$ revolves over the stationary sieve $f$, turning at the same time upon its own axis, distributer $g^1$ is stationary under which the sieve $c$ revolves together with the shaft $s$, and the brushes $e$ revolve over the stationary sieve $h$. When the brushes and lower sieve get clogged, they are reached readily by lifting the upper part of the frame from the hoop base $b$.

What I claim as my invention, is—

The arrangement of the radial rollers and horizontal brushes with the coarse and fine sieves for the purpose of renovating damaged and lumpy flour in the manner herein above set forth.

MARK S. BASSETT.

Witnesses:
M. C. GRITZNER,
T. CAMPBELL.